United States Patent [19]

Mama

[11] Patent Number: 5,084,715
[45] Date of Patent: Jan. 28, 1992

[54] LIGHT BEAM SCANNING APPARATUS

[75] Inventor: Takashi Mama, Kawasaki, Japan

[73] Assignee: Ricoh Company, Ltd., Tokyo, Japan

[21] Appl. No.: 475,696

[22] Filed: Jan. 30, 1990

[30] Foreign Application Priority Data

Feb. 2, 1989 [JP] Japan ............................. 1-10800[U]
Feb. 10, 1989 [JP] Japan ............................. 1-32315[U]
Dec. 20, 1989 [JP] Japan ............................. 1-328419[U]

[51] Int. Cl.$^5$ .................................................. H04N 1/21
[52] U.S. Cl. ....................................... 346/108; 359/212
[58] Field of Search ...................... 346/102, 108, 160; 350/6.5, 6.7, 6.8, 6.9

[56] References Cited

U.S. PATENT DOCUMENTS 4,478,480 10/1984 Doggett .............................. 350/6.7
4,863,227 9/1989 Takanashi ........................... 350/6.8

Primary Examiner—Mark J. Reinhart
Attorney, Agent, or Firm—Cooper & Dunham

[57] ABSTRACT

A light beam scanning apparatus includes a laser light source emitting a laser beam, an optical system focusing the laser beam emitted from the laser light source onto a rotating photosensitive drum, a beam scan mechanism moving the point of focus of laser beam on the photosensitive drum, in a direction perpendicular to the direction of main scan, a scan line correction mechanism correcting a scan line to a straight line when the scan line is curved.

25 Claims, 17 Drawing Sheets

LIGHT BEAM SCANNING APPARATUS

BACKGROUND OF THE INVENTION

The present invention relates to a light beam scanning apparatus applicable to an image forming apparatus of laser beam printers, digital photocopiers, plate making machines and the like.

A light beam scanning apparatus irradiates a light beam such as a laser beam or the like onto a photosensitive body. The light beam is modulated in accordance with image information signals. The modulated light beam is scanned across a predetermined range of the photosensitive body and in a fixed direction. This is the main scan. Then, the photosensitive body is moved at a constant speed in a direction perpendicular to the main scan so that a sub scan can be performed with respect to the photosensitive body by the light beam. By having a main scan and a sub scan over the photosensitive body by the light beam, a latent image such as an electrostatic latent image, corresponding to the image information signal is formed on the photosensitive body.

FIG. 1 indicates a general structure of a laser beam printer to which a laser beam scanning apparatus is applied.

A photosensitive layer is formed on a surface of a photosensitive drum which rotates at a constant speed. The laser beam emitted from the laser beam scan unit 3 scans in the direction of the axis of rotation. A charge unit 2, a developer 4, a transfer unit 5 that transfers the toner image formed on the surface of the photosensitive drum 1, to a recording sheet 7, and a cleaning unit 6 in order to remove the toner that adheres to the surface of the photosensitive drum 1 are disposed around the photosensitive drum 1. The surface of the charged photosensitive drum 1 is scanned by the laser beam modulated in accordance with image information signal from the laser scan unit so that an electrostatic latent image corresponding to the image information is formed on the surface of the photosensitive drum 1. The electrostatic latent image is developed into a toner image by a developer 4 and this toner image is transferred by the transfer unit 5 to the recording sheet 7 transported at the same speed as the periphery of the photosensitive drum 1. Then, in the process whereby the recording sheet 7 is transported, the toner image formed on the recording sheet 7 is heated and has pressure applied to it by a fixer unit 8 so that the toner image is fixed to the recording sheet 7.

The structure of the laser beam scan unit 3 described above is indicated in FIG. 1 and FIG. 3.

Inside a closed case 9 are housed a laser light source 10, a cylinder lens 11, a polygon mirror 12 that rotates at a predetermined speed, an f-θ lens 13 and a mirror 14. The bottom of the closed case 9 opposite the photosensitive drum 1 has formed in it an opening 15. This opening 15 of the closed case 9 is covered by a glass plate 16. The glass plate 16 prevents the entry of toner suspended in the air and the like from passing through the opening 15 into the closed case 9.

FIG. 3 indicates the structure of the optical system in the laser beam scan unit 3 in more detail.

The laser light source 10 has a semiconductor laser element 17 and a collimator lens 18. The light beam emitted from the semiconductor laser element 17 modulated in accordance with the image information signals is made into a parallel beam by the collimator lens 18. The laser beam that passes through the collimator lens 18 then passes through a cylinder lens 11 and is successively irradiated onto each of the surfaces of the polygon mirror 12 that is rotating at high speed. The laser beam irradiated to each of the surface of the polygon mirror 12 is deflected by a predetermined angle in accordance with the rotation of the polygon mirror 12. The deflected laser beam passes through the f-θ lens 13, is reflected by the mirror 14, and passes through the glass plate 16 to be focussed onto the surface 1a of the photosensitive drum 1. When the laser beam is deflected by a predetermined angle by the rotation of the polygon mirror 12, the point of focus of the laser beam on the surface 1a of the photosensitive drum 1 shifts in a predetermined direction in a straight line parallel to the axis of rotation of the photosensitive drum 1. This shifting of the point of focus of the laser beam performs the main scan. The speed of the shift of focus of the laser beam is a constant speed determined by the f-θ characteristics of the f-θ lens 13. In order for the photosensitive drum 1 to rotate at a fixed speed, the point of focus of the laser beam on the surface 1a of the photosensitive drum 1 shifts at a constant speed in the direction of the periphery of the photosensitive drum 1. This point of focus performs the sub scan by shifting in the direction of the periphery of the photosensitive drum 1. On the basis of the image information signals, the modulated laser beam performs a main scan and a sub scan over the surface 1a of the photosensitive drum 1 so that an electrostatic latent image corresponding to the image information is formed on the surface 1a of the photosensitive drum 1.

The beam at both ends of the range of deflection of the laser beam does not contribute to the formation of the electrostatic latent image corresponding to the image information. The laser beam at these end portions is reflected by mirror 13a and is irradiated to a light-receiving element 20. The signal output from the light-receiving element 20 are used as synchronization signal for aligning the start position for the main scan. As is indicated in FIG. 2, the light-receiving element 20 and the laser light source 10 are fixed to the side wall of the closed case 9.

As has been explained above, the track of the point of focus of the laser beam on the surface 1a of the photosensitive drum 1, that is to say, the scan line, is ideally a straight line parallel to the axis of rotation of the photosensitive drum 1. In order to make the scan line an accurate and straight line, the optical axes of each of the lenses, each of the mirrors of the polygon mirror and the other mirrors and the like in the configuration of the optical system must be accurately held at their ideal statuses. For example, if the accuracy of processing of the lens, the accuracy of processing of the holder that holds the lens, and the accuracy of mounting them are poor, then the positions of said lens will deviate (in the direction of the sub scan, for example) from its ideal position and the main scan line will bend in the direction of the sub scan.

If the position of the cylinder lens 11 and the f-θ lens 13 described above are ideal as is indicated by the solid line in FIG. 4, then the scan line on the surface 1a of the photosensitive drum 1 will be a straight line as is indicated by (a) in FIG. 5. However, if the cylinder lens 11 inclines or the f-θ lens 13 deviates in the upwards direction as indicated by the broken line in FIG. 4, then the optical axes of each of the lenses will deviate from their ideal statuses and the scan line on the surface 1a of the photosensitive drum 1 will bend in a curve in the direction of the sub scan as indicated by (b) in FIG. 5.

If the scan line bends in a curve, then the image that is formed will have the straight lines represented as curves. Accordingly, if the scan lines are curved, then high-accuracy printers and color printers that form a color image by overlapping a plural number of monochrome images formed using a plural number of laser beam scanning units will have image distortion, non-correspondence of colors and other factors that will degrade the quality.

SUMMARY OF THE INVENTION

Accordingly, it is a general object of the present invention to provide a novel and useful light beam scanning apparatus, in which the problems described heretofore are eliminated.

A more specific object of the present invention is to provide a light beam scanning apparatus for which the scan lines can be readjusted to straight lines when curves form in them.

The object of the present invention can be attained by a light beam scanning apparatus comprising a light source emitting a light beam, an optical system focusing the light beam emitted from the light source onto a moving image-forming media, a beam scan mechanism moving the point of focus of a line beam on the image-forming media in a direction perpendicular to the direction of movement of the image-forming media, and scan line correction means for correcting the scan line to a straight line when the scan line is carved which is the track of the movement of the point of focus of the laser beam on the image-forming media is curved.

Another object of the present invention is to provide a light beam scanning apparatus in which the adjustment movement of the scan line adjusts the curve of a scan line so that the position is displaced to a line parallel to the image-forming media and thus returned to its original position.

This objective can be attained the light beam scanning apparatus further comprising scan position compensation means for displacing a scan line on the image-forming media so that it is parallel.

BRIEF DESCRIPTION OF THE DRAWINGS

FIG. 15 is sectional views along the section I—I shown in FIG. 14;

DESCRIPTION OF THE PREFERRED EMBODIMENT

The following is a description of a first embodiment according to the present invention, and with reference to FIG. 6 through FIG. 10.

Figure 1:
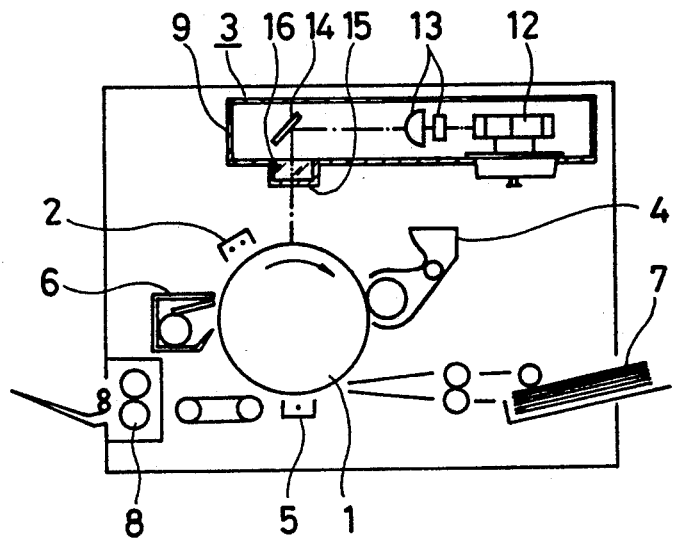
FIG. 1 is a view indicating the configuration of the main parts of a laser printer.
Figure 2:
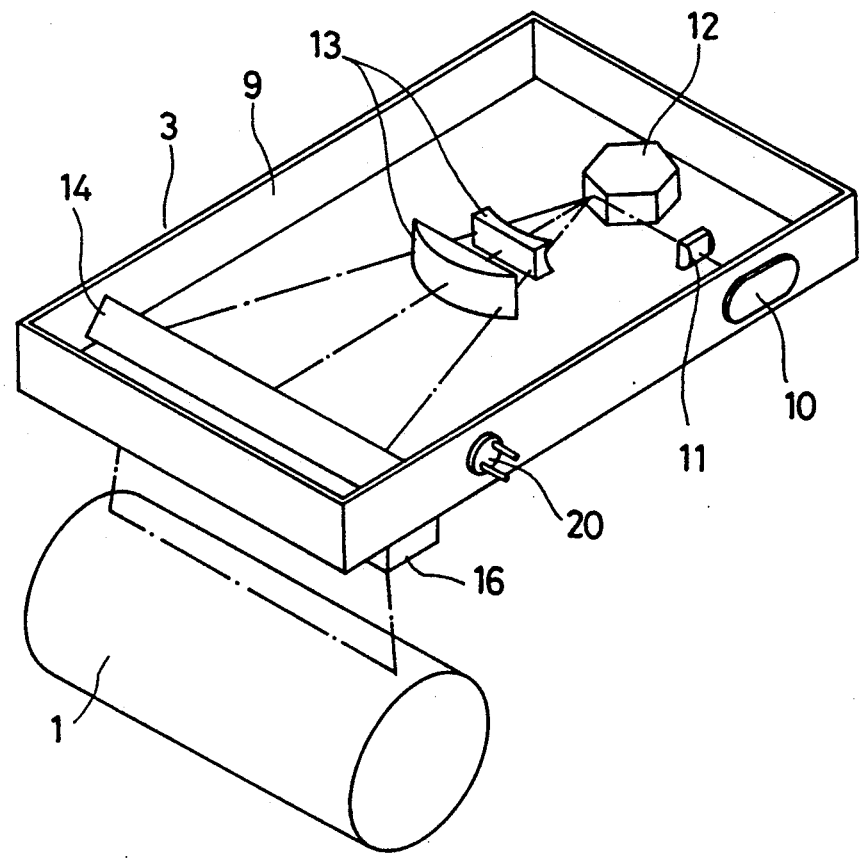
FIG. 2 and FIG. 3 are views indicating the configuration of the main portions of a conventional laser beam scanning unit.
Figure 3:
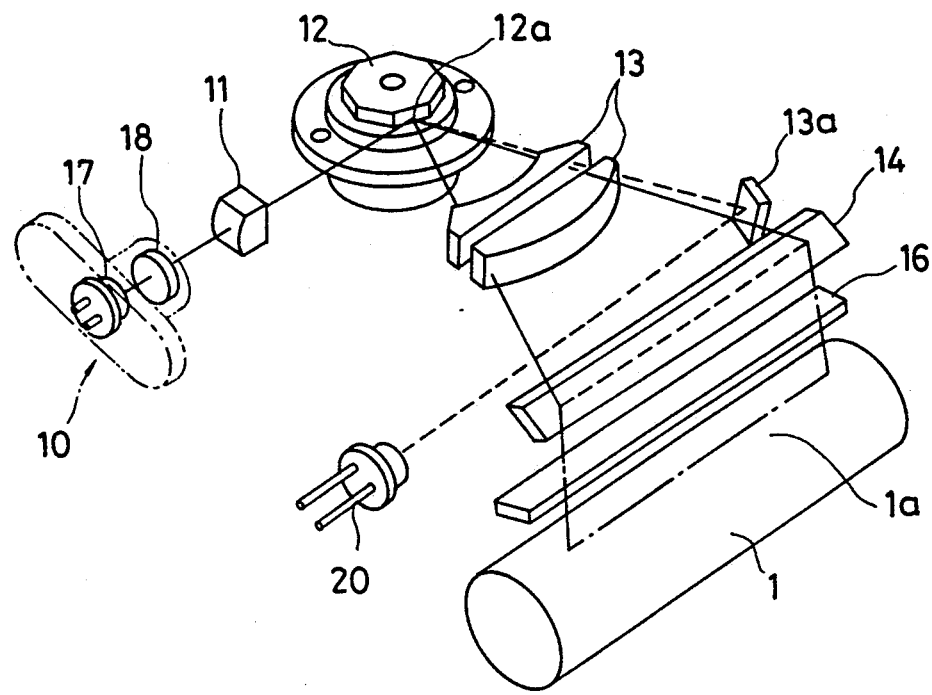
Figure 4:
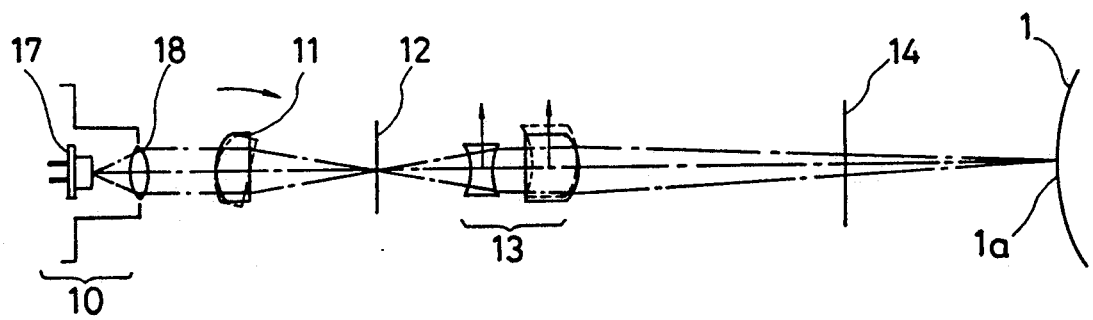
FIG. 4 is a view indicating the status of an optical system in a laser beam scanning unit.
Figure 5:
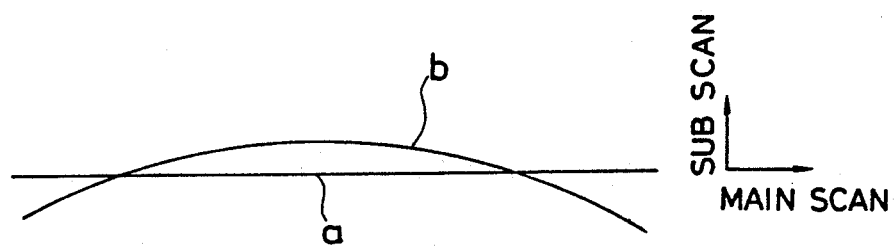
FIG. 5 is a view indicating the normal scan line and a curved scan line.

The description is for a laser beam scan unit suitable for application to a laser printer for which the structure is basically the same as the structure indicated in FIG. 1 through FIG. 3. That is to say, the laser beam scan unit 3 is provided with a closed case 9, a laser light source 10, an optical system comprising a cylinder lens 11, a polygon mirror 12, a f-θ lens 13, a mirror 14 and the like, a beam scan mechanism provided with a polygon mirror 12 rotating at a predetermined speed, and a glass plate 16 that covers an opening 15 formed in the closed case 9.

Figure 6:
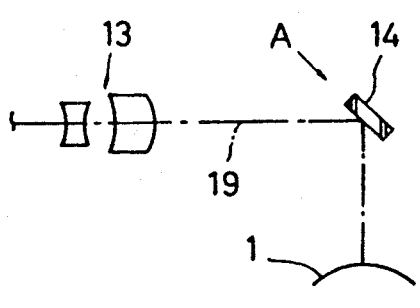
FIG. 6A to 6C are a view indicating the status of a normal mirror and a scan line.
Figure 6:
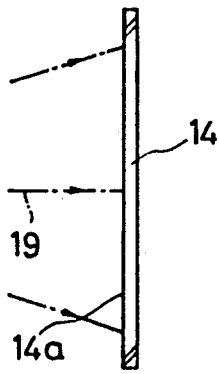
Figure 6:
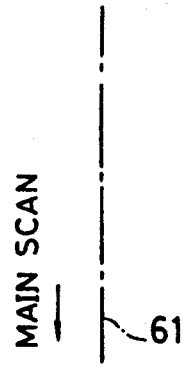
Figure 7:
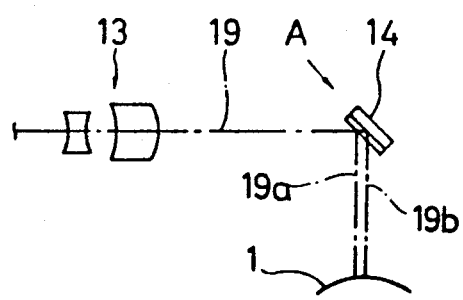
FIGS. 7A, 7B, 7C, 8A, 8B and 8C are views indicating a curved mirror and a scan line.
Figure 7:
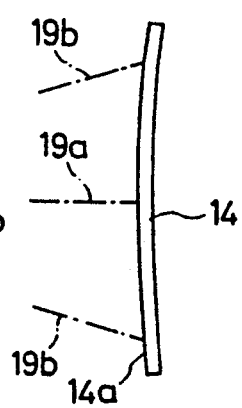
Figure 7:
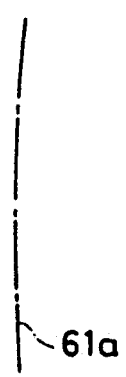
Figure 8:
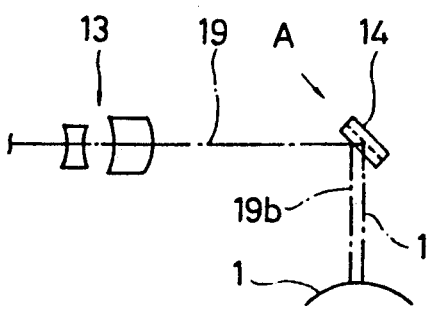
Figure 8:
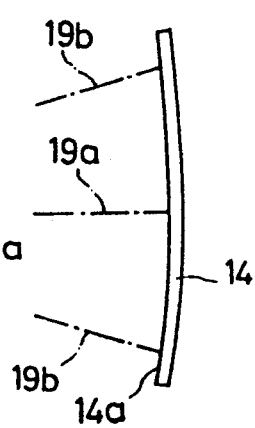
Figure 8:

The principle involved in curving the scan line on the photosensitive drum 1 by the used of the mirror 14 is described with respect to FIG. 6 through FIG. 8.

As is indicated in FIGS. 6(a) and (b), when the mirror 14 is not curved, the polygon mirror 12 irradiates the laser beam 19 deflected in a planar surface, onto the mirror 14 as indicated in FIG. 6(b). The reflective surface 14a of the mirror 14 is planar and so the scan line 61 formed on the surface of the photosensitive drum 1 is a straight line as indicated in FIG. 6(c).

As indicated in FIGS. 7(a) and (b), when the mirror 14 curves in the normal direction so that the central portion of the mirror 14 protrudes to the side of the f-$\theta$ lens 13, the laser beam 19 is irradiated to the mirror 14 as indicated in FIG. 7(b). The position on the photosensitive drum 1 where the laser beam 19a is focused which is reflected by the reflective surface 14a of the central portion of the mirror 14 is closer to the f-$\theta$ lens 13 than the position where the laser beam 19b is focused which is reflected by the reflective surface 14a of the end portion of the mirror 14. Accordingly, as is indicated in FIG. 7(c), the scan line 61a formed on the photosensitive drum 1 is formed as a curve.

In addition, as indicated in FIGS. 8(a) and (b), when the mirror 14 is curved in the direction of the normal so that the central portion of the mirror 14 protrudes to the side opposite the f-$\theta$ lens 13, the laser beam 19 is irradiated to the mirror 14 as indicated by FIG. 8(b). The position on the photosensitive drum 1 where the laser beam 19a is focused is further than the position where the laser beam 19b is focused. Accordingly, as indicated in FIG. 8(c), the scan line 61b formed on the photosensitive drum 1 is formed as a line curving in the direction opposite to the direction of the curve indicated in FIG. 7(c).

The curve of the scan line on the photosensitive drum 1 corresponds to the curve of the mirror 14.

The position and inclination of the components of the optical system in the laser beam scan unit 3 are displaced from their regular positions and so when the scan line on the photosensitive drum 1 is curved, curving the mirror 14 allows the scan line to be compensated to a straight line. This is to say that when the scan line is curved, the mirror 14 is curved so as to curve the scan line in the opposite direction. The amount of curve of the mirror 14 is determined as the amount to actually make an actual scan line into a straight line.

Figure 9:
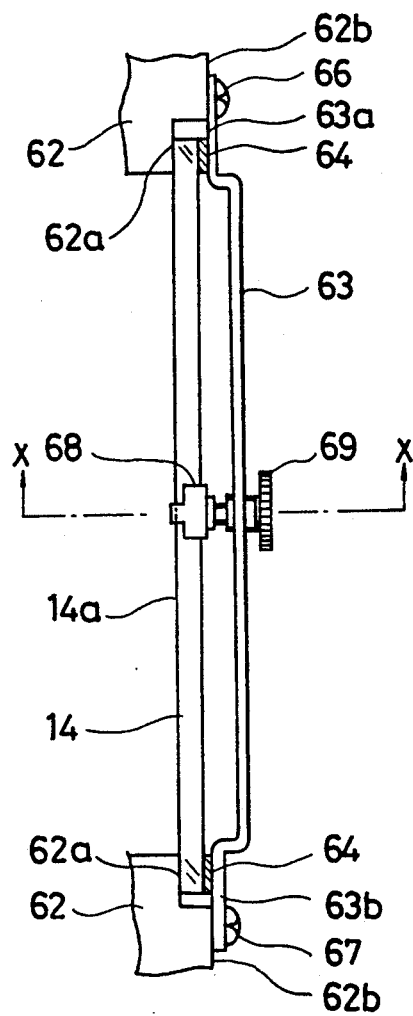
FIG. 9 and FIG. 10 are views indicating the mechanism that curves the mirror.
Figure 10:
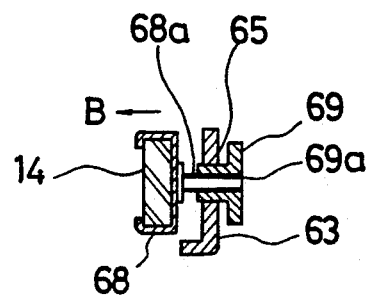

FIG. 9 and FIG. 10 indicate the structure of the mechanism that curves the mirror 14 into the direction of the normal. FIG. 9 is a plan view when seen from the direction parallel to the mirror 14, and FIG. 10 is a sectional view along the line X—X of FIG. 9.

Both ends of the mirror 14 are fixed in the direction of the main scan by the holding blocks 62. the holding blocks 62 have a first surface 62a and a second surface 62b. Between the first surface 62a and the second surface 62b is a step. The reflective surface 14a of the mirror 14 is held by the first surface 62a of the holding blocks 62. At the rear side of the mirror 14, both ends 63a and 63b of metal stay 63 are fixed to the second surface 62b of the holding blocks 62 by screws 66 and 67.

The end portions of the mirror 14 are held between the end portions 63a and 63b of the metal stays 63 and the first surface 62a of the holding blocks 62. Both of the ends 63a and 63b of the metal stay 63 are pressed against the mirror 14. By the above structure, both ends of the mirror 14 are fixed to the holding blocks 62.

The sectional shape of the metal stay 63 is the shape of a letter "L" as is indicated in FIG. 10. This shape makes it difficult for the metal stay 63 to deform.

The central portion of the metal stay 63 has a screw hole 65 formed in it and this hole engages with an adjustment screw 69. Corresponding to the position at which the adjustment screw 69 is provided is a stopper 68 at the rear surface of the mirror 14. This stopper 68 is formed of a metal plate, for example, and as indicated in FIG. 10, holds the mirror 14 and forms a single unit with the mirror 14. A screw 68a forms a unit with the stopper 68 and the screw 68a protrudes from the stopper 68. This screw 68b engages with the hole 69a of the adjustment screw 69 described above.

The pitch of the thread of the adjustment screw 69 is larger than the pitch of the thread of the screw 68a provided in the stopper 68. For example, the pitch of the thread of the adjustment screw 69 is 1 mm (an M6 screw: Japan Industrial Standards) and the pitch of the thread of the screw 68b is 0.5 mm (an M3 screw: Japan Industrial Standards). If the adjustment screw 69 is turned once in the clockwise direction, then the adjustment screw 69 moves 1 mm in the direction of the arrow B in FIG. 10. In addition, the screw 68b moves 0.5 mm in the direction opposite to the arrow B when the corresponding screw hole 69a is turned once in the clockwise direction. As a result, the stopper 68 that forms a unit with the screw 68a moves 0.5 mm in the direction of the arrow B and with respect to the metal stay 63.

This is to say that the rotation of the adjustment screw 69 in the clockwise direction presses the rear of the central portion of the mirror 14 so that the mirror 14 is curved so that its central portion protrudes in the direction of the arrow B. This corresponds to the status indicated in FIG. 7. On the other hand, the rotation of the adjustment screw 69 in the anticlockwise direction pulls from the rear of the central portion of the mirror 14 so that the mirror 14 is curved so that its central portion protrudes in the direction opposite the direction of the arrow B. This corresponds to the status indicated in FIG. 8.

In the embodiment described above, a single mirror 14 is provided in the optical path of the laser beam from after the f-$\theta$ lens 13. If a plural number of mirrors are provided, then one of these mirrors is provided with a mechanism to curve it. If a plural number of mirrors are provide, then it is desirable that the mirror to be provided with the mechanism be the mirror that is closest to the photosensitive drum 1.

The following is a description of a second embodiment according to the present invention, and given with respect to FIG. 11A through FIG. 24.

Figure 11A:
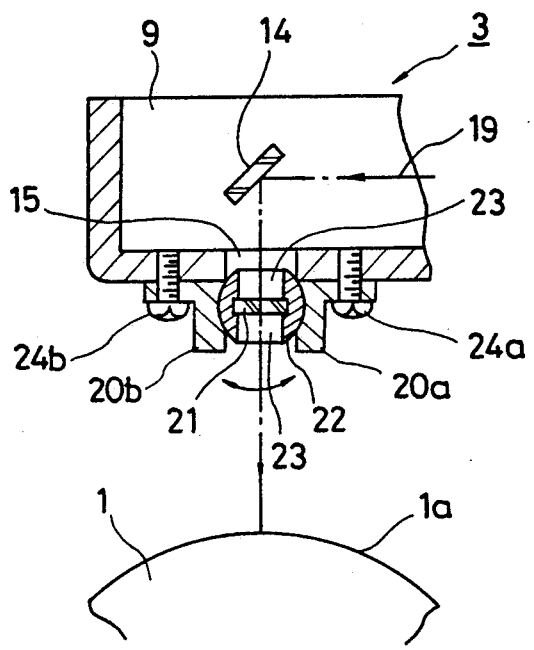
FIG. 11A and FIG. 11B are views indicating the mechanism that rotates the glass plate.

FIG. 11A is a longitudinal sectional view that is an enlargement of the portion in the vicinity of the mirror 14 in the closed case 9 of the laser beam scan unit 3.

Figure 11B:
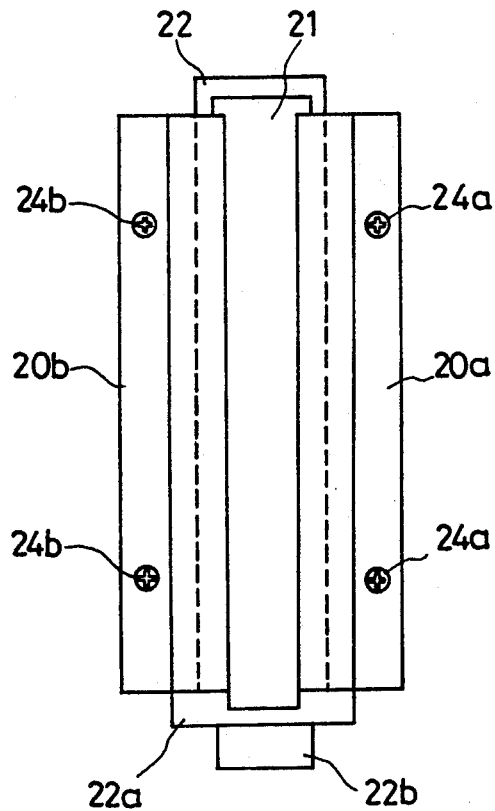
Figure 11C:
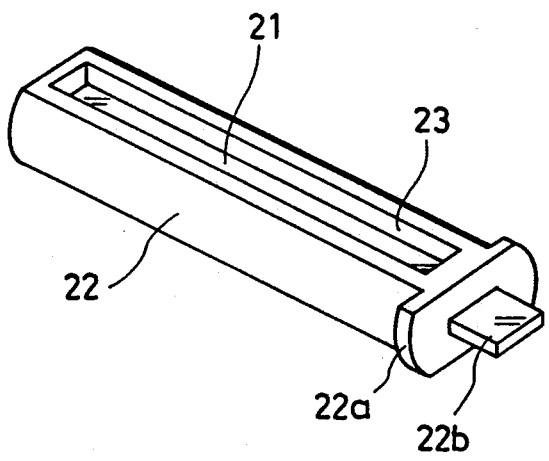
FIG. 11C is a view indicating the structure of the members that holds the glass plate.

A glass plate 21 (transparent member) housed in a holder 22 is provided so as to cover the opening 15 through which the laser beam reflected by the mirror 14 passes. As indicated in FIG. 11C, the holder 22 has openings 23 formed in both the top surface and the bottom surface. The front surface and rear surface of the glass plate 21 housed in the holder 22 expose from the openings 23. The side of the holder 22 is formed in an arc shape. One end of the holder 22 is formed with a flange 22a protruding from the side. In addition, an end surface of the flange 22a formed in the holder 22 has formed on it a grip 22b that protrudes from said end surface. The holder 22 including the flange 22a and the grip 22b is monolithically formed of resin in the status where the glass plate 21 is inserted. The holder 22 is held by a first support member 20a and a second support member 20b at the bottom of the closed case 9, so that the surface of the glass plate 21 opposes the opening 15. The first support member 20a and second support member 20b are formed of resin and in section have the shape of a letter "L". The first support member 20a and the second support member 20b are, as indicated in FIG. 11A and FIG. 11B, fixed to the bottom surface of the closed case 9 by the screws 24a and 24b. The holder 22 is held between the first support member 20a and second support member 20b. The peripheral surface of the holder 22 is formed in an arc shape so as to be in agreement with the shape of the peripheral wall of the holder 22. Whereby, the holder 22 held between the first support member 20a and the second support member 20b rotates around the axis parallel to the axis of rotation of the photosensitive drum 1. The holder 22 covers the opening 15. Accordingly, toner and the like does not enter the closed case 9 via the opening 15. It is possible to remove the holder 22 from between the first support member 20a and the second support member 20b by pulling it in the direction indicated by the arrow in FIG. 11B. In addition, it is possible to insert the holder 22 between the first support member 20a and the second support member 20b in the direction opposite to the direction indicated by the arrow. The holder 22 is inserted between the first support member 20a and the second support member 20b until the flange 22b reaches the ends surfaces of the first support member 20a and the second support member 20b. The operator rotates the holder 22 by the grip 22b.

By the mechanism described above, the mirror 14 onto which the laser beam 19 is focussed with respect to the glass plate 21 freely rotatable about an axis of rotation parallel to the axis of rotation (the direction of the main scan) of the photosensitive drum 1, is supported by the mechanism indicated in from FIG. 12 to FIG. 15. By this mechanism, the mirror 14 is movable in the direction perpendicular to the axis of rotation of the photosensitive drum 1, that is to say, the direction of the sub scan.

Figure 12:
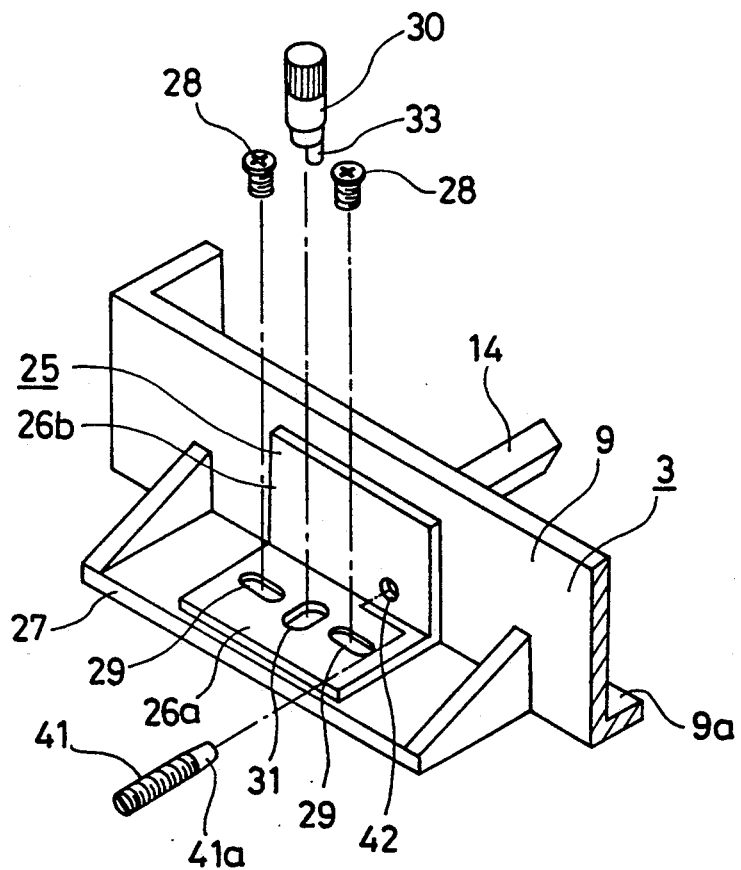
FIG. 12 and FIG. 13 are views indicating the mechanism that slides the mirror.
Figure 13:
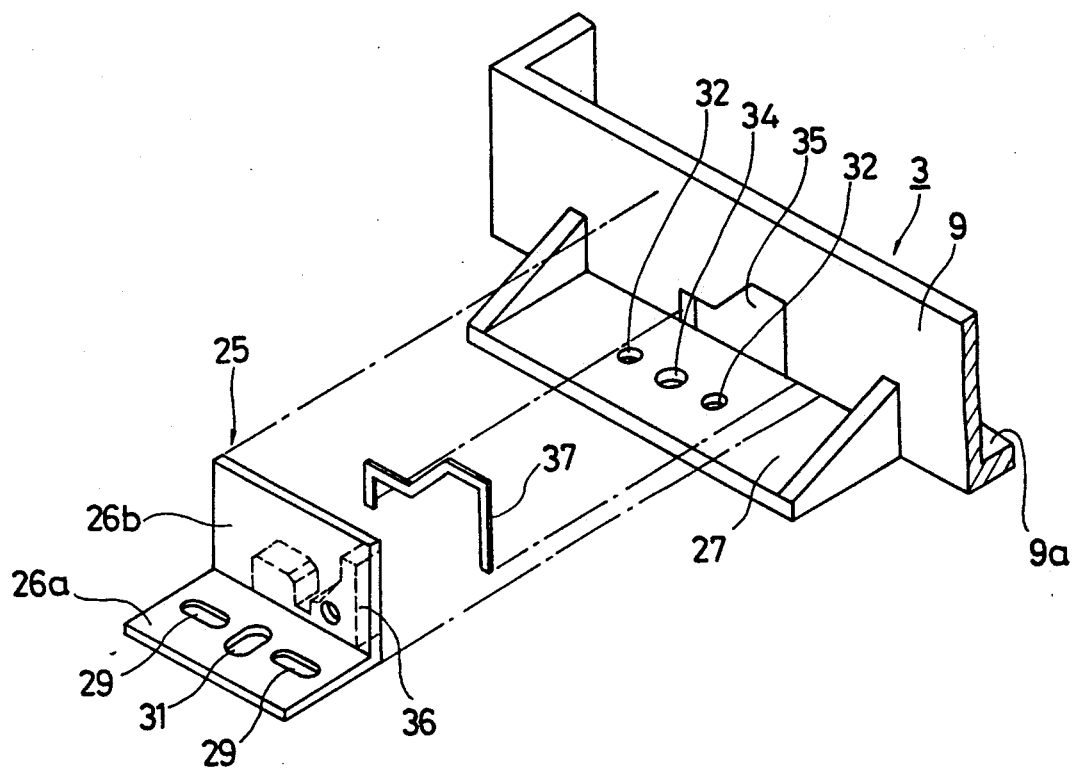

As is indicated by FIG. 12 and FIG. 13, a base plate 27 protrudes towards the outside from both of the side surfaces of the closed case 9. The base plate 27 is formed of resin as a single unit with the closed case 9. The base plate 27 has two screw holes 32 and a hole 34 formed on the central portion of the base plate 27. A support 25 is mounted on the base plate 27. This support 25 has a structure whereby a longitudinal plate 26b protrudes perpendicularly from end of the bottom plate 26a. The support 25 is provided with a base plate 27 so that bottom plate 26a is connected to the base plate 27 and so that the longitudinal plate 26b is connected to the side wall of the closed case 9. A long hole 31 corresponding to the hole 34 in the base plate 27 and a long hole 29 corresponding to a screw hole 32 are formed in the bottom plate 26a. The surface of the longitudinal plate 26b on the side of the closed case 9 has formed in it a support block 36. The support 25 including the bottom plate 26a, the longitudinal plate 26b and the support block 36 is formed as a single unit of resin.

An opening 35 is formed in the side wall of the closed case 9 so as to correspond to the support block 36 of the support 25. The support 25 is provided with a base plate 27 so that the support block 36 passes through the opening 35 to protrude to inside the closed case 9. There is a gap between the edge of the opening 35 and the support block 36 and it is possible to move the support 25 along the side wall of the closed case 9. A sealing member 37 formed of rubber of the like is provided around the opening 35. The sealing member 37 is held between the longitudinal plate 26b of the support 25 and the side wall of the closed case 9. This sealing member 37 prevents the entry of toner, dust or the like into the closed case 9.

An eccentric pin 33 of a shaft 30 passes through the long hole 31 of the support 25 and engages with the hole 34 in the base plate 27. The screw 28 passes through the long hole 29 of the support 25 and engages with the screw hole 32 of the base plate 27. This screw 28 fixes the support 25 to the base plate 27.

Figure 14:
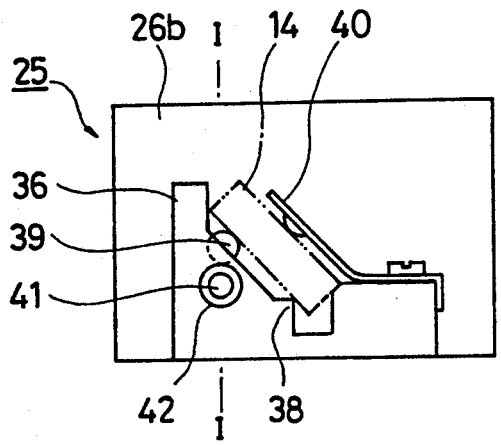
FIG. 14 and FIG. 15 are views showing the mechanism that rotates the mirror.
Figure 15:
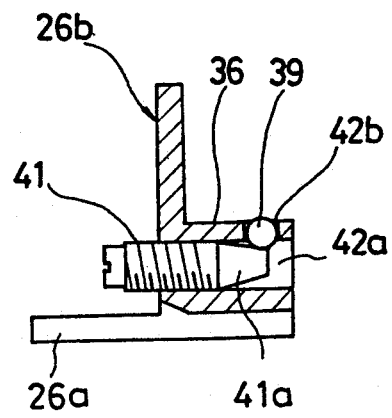

The support block 36 of the supports 25 protruding to the inside of the closed case 9 supports both ends of the mirror 14. FIG. 14 is a side elevation when the support 25 is seen from the inside of the closed case 9. The support block 36 has a steel ball 39 that supports the upper portion of the reflective surface of the mirror 14, and a protrusion 38 that supports the lower portion of the reflective surface. The protrusion 38 is formed as a single unit as an corner portion of the support block 36. The steel ball 39 is, as indicated in FIG. 15 (showing a sectional elevation of FIG. 14 I—I), housed inside the hole 42b so that it is movable upwards and downwards. This hole 42b passes from the upper surface of the support block 36, to through a screw hole 42a formed in the support block 36. The screw hole 42a engages with the adjustment screw 41b of which the taper portion 41a is formed at the distal end. The steel ball 39 is supported by the taper portion 41a of the adjustment screw 41. The mirror 14 supported by the above described protrusion 38 and the steel ball 39 is pressed against them by a flat spring 40. The mirror 14 is fixed to the support block 36 by this flat spring 40. Both end portions of the mirror 14 are supported by the same structure as has been described above. If the screw 28 is loosened and the shaft 30 is rotated, then the support 25 is moved along the side wall of the closed case 9. This is to say that the mirror 14 is moved in the direction of the sub scan. In addition, if the screw 41 is rotated, then the position at which the taper portion 41a is in contact with the steel ball 39 changes so that the steel ball 39 moves up and down and therefore rotates the mirror 14 around the center of the protrusion 38.

Figure 16:
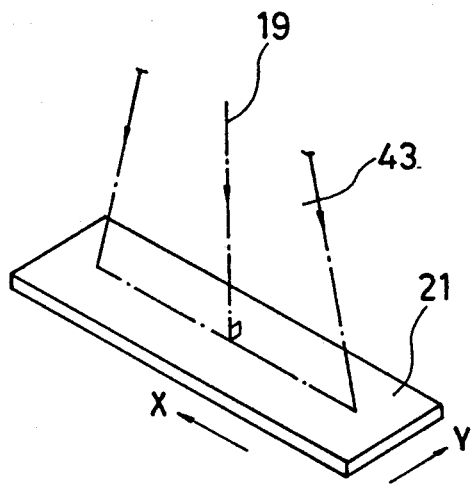
FIG. 16 is a perspective view indicating the glass plate in the status where it is perpendicular with respect to the light beam.
Figure 17:
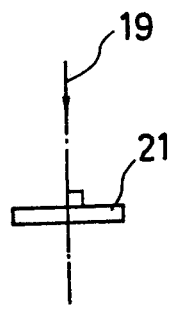
FIG. 17 is a side elevational view of the glass plate of FIG. 16.
Figure 18:
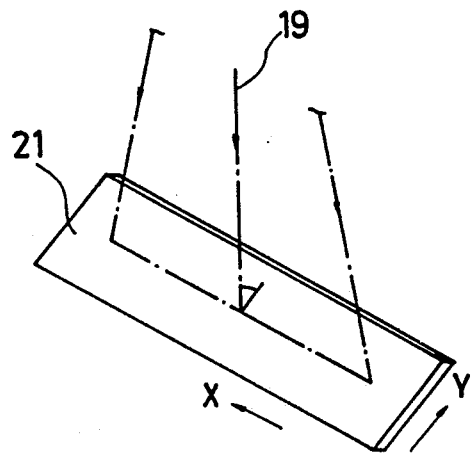
FIG. 18 is a perspective view indicating the status where the glass beam is inclined with respect to the laser beam.
Figure 19:
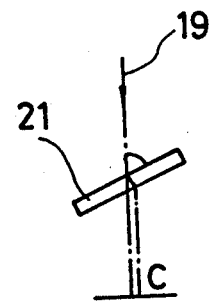
FIG. 19 is a side elevational view of the glass plate of FIG. 18.
Figure 20:
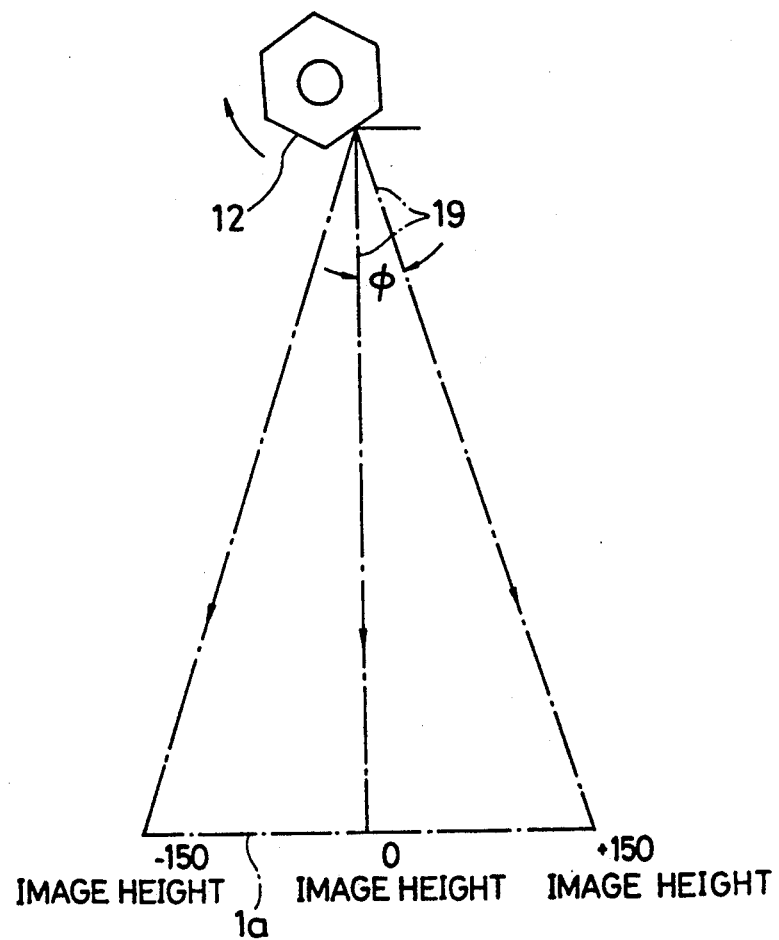
FIG. 20 is a view indicating the scan range over the surface of the photosensitive drum.

A laser beam 19 emitted from the laser light source 10 and striking the polygon mirror 12 and being deflected over an angle of a predetermined range is reflected by the mirror 14 and passes through the glass plate 21 to scan a scan surface 1a. FIG. 16 is a perspective view indicating the status where the laser beam 19 passes over the glass plate 21 disposed perpendicularly to the deflection surface 43. FIG. 17 is a side view of the same situation. In this case, the line normal to the glass plate 21 and the optical axis of the laser beam 19 are in agreement and so the laser beam 19 does not deviate in the direction of the sub scan indicated by the arrow Y. The arrow X indicates the direction of the main scan. FIG. 18 is a perspective view indicating the status where the glass plate 21 and the holder 22 are rotated around an axis parallel to the main scanning line and inclined with respect to the deflection surface 43. FIG. 19 is a side elevational view of this situation. In this case, the laser beam 19 is displaced by only the amount of deviation c in the direction of the sub scan after it has passed the glass plate 21.

Figure 21:
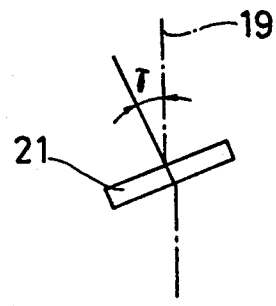
FIG. 21 and FIG. 22 are views indicating the status where the glass plate is inclined with respect to the laser beam.

This amount of deviation c becomes larger for the distance from the central portion towards the ends of the main scan. This is because the angle of incidence of the laser beam 19 with respect to the glass plate 21 differs according to the position in the main scanning direction. This is to say that in FIG. 20, the laser beam 19 scans a range of ±150 mm either side of the center which is the image height position 0 at the middle of the surface 1a. The angle between a laser beam 19 scanning towards the image height position 0 and a laser beam 19 scanning towards the image height position ±150 mm is $\psi$. As indicated in FIG. 21, the angle of incidence of a laser beam 19 in the direction of the image height position 0 and with respect to the glass plate 21 is $\gamma$. The incident angle $\theta$ with respect to the glass plate 21, of a laser beam 19 scanning in the direction of the image height position ±150 mm is given by the following formula.

$$\theta = \cos^{-1} \frac{1}{\sqrt{1 + \tan^2\beta + \tan^2\gamma}} \quad (1)$$

$$\text{Here, } \beta = \tan^{-1} \frac{\tan\psi}{\cos\gamma}$$

Figure 22:
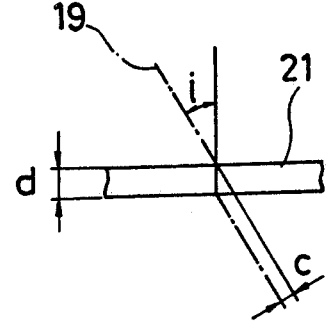

In addition, as indicated in FIG. 22, when the thickness d of the glass plate 21 and its refractive index are considered, the relationship between the angle of incidence i and the amount of deviation from the axis c is as follows.

$$c = d \cdot \sin i \frac{1 - \cos\theta}{\sqrt{n^2 - \sin^2\theta}} \quad (2)$$

Accordingly, if the amount of deviation from the axis of the laser beam 19 heading in the direction of image height position ±0 mm is $c_0$, and if the amount of deviation from the axis of the laser beam 19 heading in the direction of image height position ±150 mm is $c_{150}$, then the following holds.

$$c_0 = d\sin\gamma \left(1 - \frac{\cos\gamma}{\sqrt{n^2 - \sin^2\gamma}}\right) \quad (3)$$

$$c_{150} = d\sin\theta \left(1 - \frac{\cos\theta}{\sqrt{n^2 - \sin^2\theta}}\right) \quad (4)$$

Figure 23:
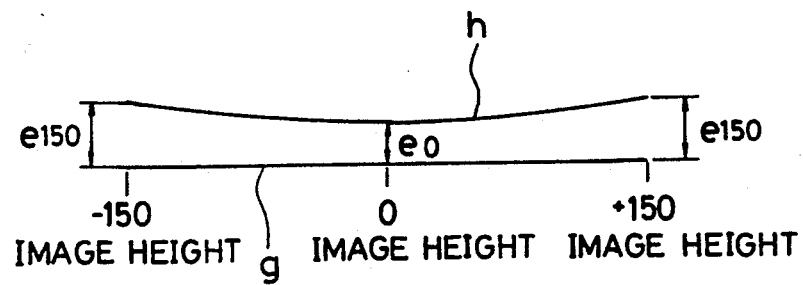
FIG. 23 is a view indicating the shape of the scan line on the surface of the photosensitive drum.

As can be seen in FIG. 23, if the amounts of deviation from the axis of the laser beam 19 in the direction of the image height position ±0 mm and the image height position ±150 mm for only the direction of the sub scan are made $e_0$ and $e_{150}$ respectively, then $$e_0 = c_0 \quad (5)$$

$$e_{150} = \frac{c_{150}\sqrt{\sin^2\eta + \cos^2 \cdot \cos^2\lambda}}{\cos\theta(\cos\eta + \sin\eta \cdot \tan\theta)}$$

-continued $$\text{Here, } \lambda = \frac{\tan\psi}{\tan\gamma}$$

$$\eta = \tan^{-1}(\tan\eta \cdot \cos\lambda)$$

In the angle of incidence $\gamma$ with respect to the glass plate 21, of the laser beam 19 heading in the direction of the image height position 0 (refer to FIG. 21) is made 0°, then the scan line track g which is a straight line parallel to the main scan direction will be obtained. As one example, if $\gamma = 30°$, $\psi = 20°$, d = 5 mm and n = 1.5, then if the amounts of axial displacement $e_0$ and $e_{150}$ of a laser beam heading towards image height position ±150, in the direction of the sub scan are determined, then $e_0 = 0.969$ mm, and $e_{150} = 1.064$ mm.

This difference of 0.095 mm is, as indicated in FIG. 23, the cause of the scan lines becoming curved. In addition, even at the middle (image height position 0) of a scan surface 1a, the scan line deviates in the direction of the sub scan.

Figure 24:
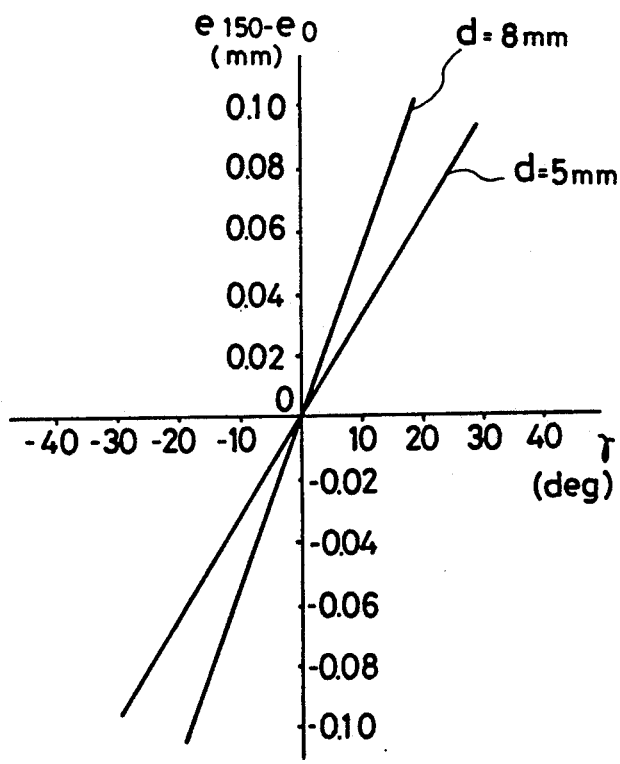
FIG. 24 is a graph indicating the relationship between the angle of inclination of the glass plate and the displacement of the sub scan direction of the scan line.

FIG. 24 is a graph indicating the relationship between the amount of curvature ($e_{150} - e_0$) of the scan line and the inclination $\gamma$ of the glass plate 21. In FIG. 24, the thickness d of the glass plate 21 is shown as both 5 mm and 8 mm. By changing the thickness d of the glass plate 21 it is possible to change the amount of curvature of the scan line. By changing the refractive index of the glass plate 21 it is also possible to change the amount of curvature of the scan line.

Poor mounting accuracy of the optical system components in the optical path and other factors causing curved scan lines is adjusted by rotating the holder 22 indicated in FIG. 11A through FIG. 11C so that the glass plate 21 is inclined by the angle $\gamma$ with respect to the laser beam 19. By this adjustment, the curved scan lines are curved in the opposite direction.

Accordingly, after the adjustment, the scan lines are straight lines.

As has been described above, inclining the glass plate 21 enables the scan lines to be corrected to straight lines and inclining the glass plate 21 with respect to the laser beam 19 moves the said scan lines in the direction of the sub scan on the photosensitive drum 1 in accordance with the characteristics indicated in FIG. 24. This displacement of the scan lines in the direction of the sub scan is compensated for as follows.

The screw 28 is loosened, and the shaft 30 made to engage with the long hole 31 of the support 25 and the cam eccentric 33 made to engage with the hole 34 (refer to FIG. 13) in the base plate 27. By turning the shaft 30 around the center of the eccentric pin 33, the support 25 is displaced along with the mirror, in the direction of the sub scan. When the position of the mirror 14 has been determined, the screw 28 is tightened and the support 25 is fixed to the base plate 27 and the shaft 30 is released. This operation is performed for the support 25 at both ends of the mirror 14. In this manner, when the mirror 14 has been moved in the direction of the sub scan, the position of the scan lines on the surface 1a and in the direction of the sub scan is correctly adjusted.

The adjustment screw 41 indicated in FIG. 12, FIG. 14 and FIG. 15 is used to change the upwards and downwards position of the steel ball 39 so that the mirror 14 is rotated around the protrusion 38 and the position in the direction of the sub scan of the scan line of the surface 1a is correctly adjusted.

As has been described above, the two types of adjustment, that is to say, the adjustment by rotating the mirror 14 and the adjustment of moving the mirror 14 in the direction of the sub scan can both be performed independent of the other. In addition, by performing both adjustments, it is possible to compensate for the position of the scan lines in the direction of the sub scan.

In addition, although it is not indicated in the figures, the same adjustment can also be obtained by a mechanism to move the entirety of the closed case 9 of the laser beam scan unit 3 in the direction of the sub scan.

Figure 25:
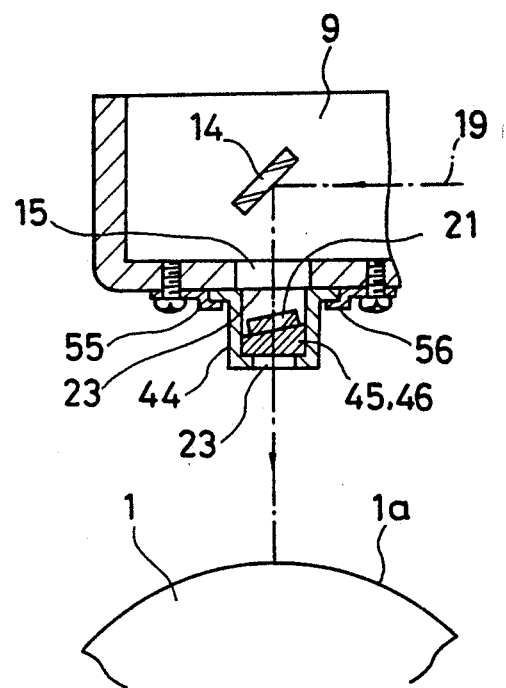
FIG. 25 and FIG. 26 are views indicating the mechanism that inclines the glass plate, with FIG. 25 being a sectional view of the mechanism, and FIG. 26 being an exploded perspective view of the mechanism.
Figure 26:
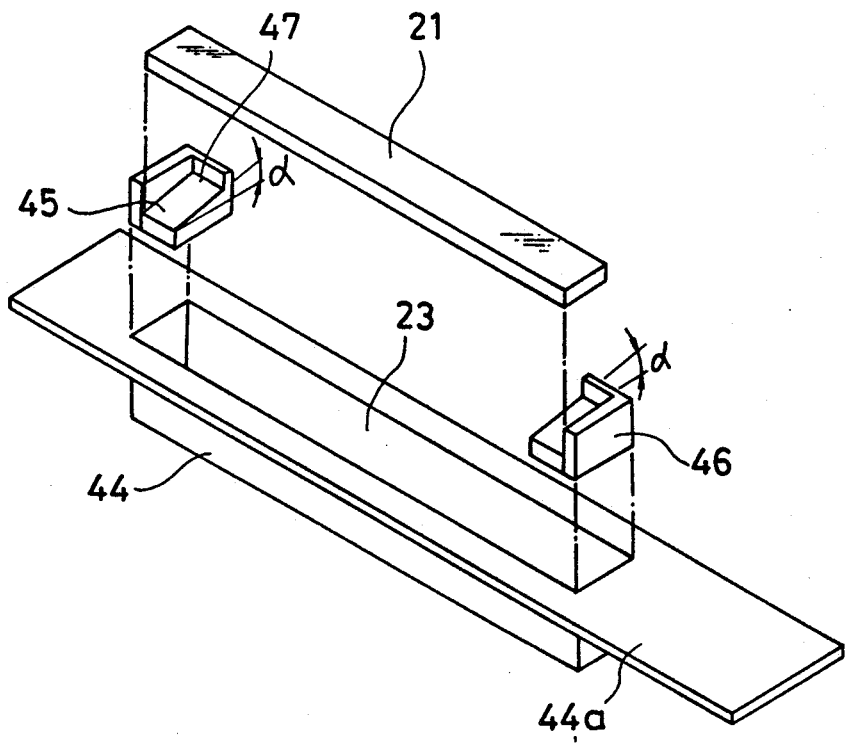

FIG. 25 and FIG. 26 indicates another embodiment of a mechanism to incline the glass plate 21.

In this case as well, the structure of the laser beam scan unit 3 is basically the same as the structure indicated in FIG. 2 and FIG. 3.

FIG. 25 is a longitudinal sectional view indicating one portion of the closed case 9. Here, a holder 44 is mounted so as to cover the opening 15 formed in the bottom surface of the closed case 9.

Openings 23 are formed in the upper surface and the lower surface of this holder 44. The upper surface of the holder 44 has a flange 44a formed as indicated in FIG. 26. Holder plates 55 and 56 on both sides of the opening 15 in the bottom surface of the closed case 9 are stopped by screws. By the flange 44a of the holder 44 being supported by the holder plates 55 and 56, the holder 44 is mounted to the bottom surface of the closed case 9. The holder 44 is slidably movable along the holder plates 55 and 56. As indicated in FIG. 26, both ends of the holder 44 have provided support blocks 45 and 46 to support the glass plate 21. These support blocks 45 and 46 have receiving surfaces 47 upon which the glass plate 21 rests. The receiving surfaces 47 are inclined at an angle $\alpha$ with respect to the horizontal. The angle of inclination $\alpha$ of the receiving surfaces 47 enables a plural number of support blocks 45 and 46 to be used. For example, a plural number of support blocks 45 and 46 for which the angle of inclination $\alpha$ of the receiving surfaces 47 changes in 10° increments are provided for.

When the scan lines on the surface 1a of the photosensitive drum 1 are curved, successively exchanging the support blocks 45 and 46 that support the glass plate 21 can be performed to adjust the inclination of the glass plate 21 in the direction of the sub scan. By adjusting the inclination of these glass plate 21, it is possible to correct curved scan lines into straight lines as has been described before.

The following is a description of a third embodiment according to the present invention, with reference to FIG. 27 through FIG. 31.

Figure 27:
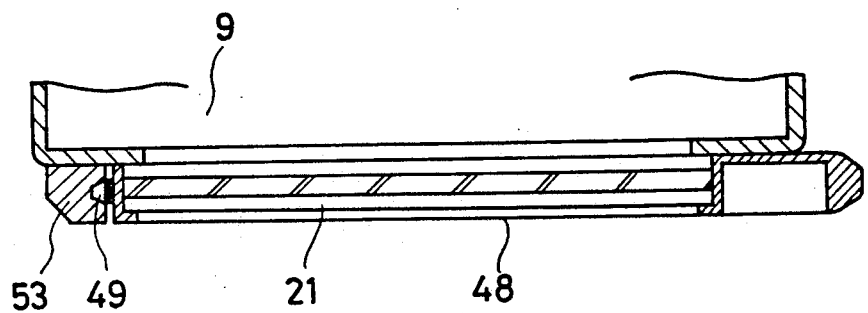
FIG. 27 is a sectional view indicating the mechanism that rotates the glass plate.

When the scan lines are curved, then in the same manner as has been described before, the glass plate 21 through which the laser beam passes, is inclined in the direction of the sub scan so that the scan lines are corrected into straight lines. The mechanism for inclining the glass plate 21 is indicated in FIG. 27. A holder 48 that supports the glass plate 21 is provided on the bottom surface of the closed case 9 and the holder 48 rotates around an axis parallel to the direction of the main scan. The rotation of this holder 48 inclines the glass plate 21 in the direction of the sub scan of the laser beam.

When the glass plate 21 is inclined with respect to the laser beam, the curved scan lines are corrected into straight lines. However, the corrected scan lines are displaced in the direction of the sub scan. In this embodiment, the scan timing of the laser beam is controlled so that compensation is performed for the position of the scan lines in the direction of the sub scan.

The displacement of the position of the scan lines in the direction of the sub scan corresponds to the angle of inclination of the glass plate 21 as indicated in FIG. 24. Accordingly, in this embodiment, the angle of inclination of the glass plate 21 is detected and the detected angle used as the basis for controlling the scan timing.

Figure 28:
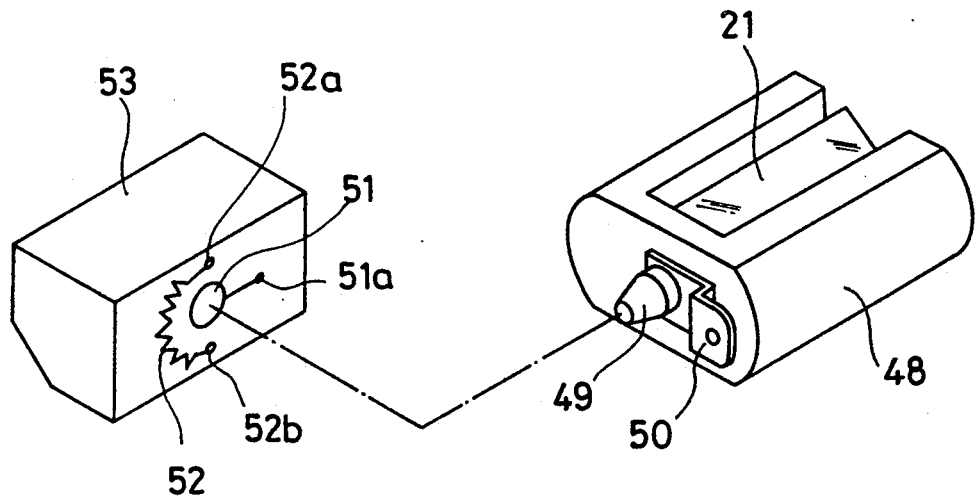
FIG. 28 is a view indicating the mechanism of an angle sensor that detects the angle of the rotation of the glass plate.

As indicated in FIG. 27, the end portions of the holder 48 that holds the glass plate 21 are provided with sensors 53 that detect the angle of inclination of the holder 48. At one of the ends of the holder 48 is provided a pin 49 that protrudes from the end surface, as indicated in FIG. 28. This pin 49 is formed of a metal. In addition, at the end of holder 48 is provided a moving piece of metal 50 connected to the pin 49. A connecting hole 51 is formed at an end surface of the angle sensor 53. A resistor 52 is provided around the connecting hole 51. The connecting hole 51 has a metal receiving portion formed and the support portion is electrically connected to the terminal 51a. The pin 49 of the holder 48 is engaged with the connecting hole 51 and the pin 49 is in contact with the receiving portion. In addition, the pin 49 is in the status where it is in engagement with the connecting hole 51 and the moving piece of metal 50 of the holder 48 is in contact with the resistor 52. One of the terminals 52a of the resistor 52 is electrically connected to a power supply of an output voltage of 5 V and the other terminal 52b is connected to the ground. Accordingly, a voltage level corresponding to the angle of inclination of the holder 48 is output as an angle detect signal from the terminal 51a of the angle sensor 53.

Figure 29A:
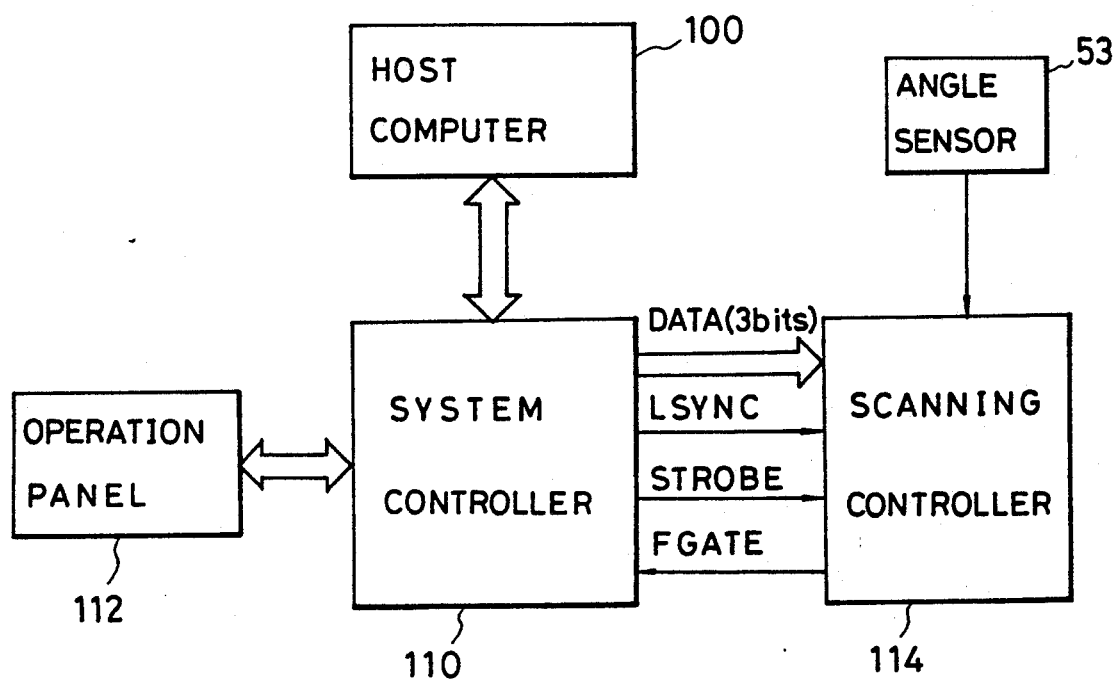
FIG. 29A is a block diagram indicating the configuration of the control system for the printer.

The configuration of the control system for the laser beam scan unit 3 is indicated in FIG. 29A and FIG. 19B, for example.

A system controller 110 performs the sending and receiving of data and control signals to and from a host computer 100. The system controller 110 is supplied with print commands and other operation signals from an operation panel 112. The system controller 110 supplies image data (3-bit) and horizontal synchronization signal (LSYNC) and an image clock (STROBE) to the scan controller 114. The horizontal synchronization signal (LSYNC) is signal that indicates the timing for the start of the line scan and the image clock (STROBE) is a signal that indicates the scan timing of each pixel.

The angle detect signals from the previously described angle sensor 53 are input to the scan controller 114. The scan controller 114 supplies the vertical synchronization signal FGATE that is effective during the scan of one line, to the system controller 110. The laser light source 10 is modulated on the basis of the image data for the duration that the vertical synchronization signal FGATE is effective.

Figure 29B:
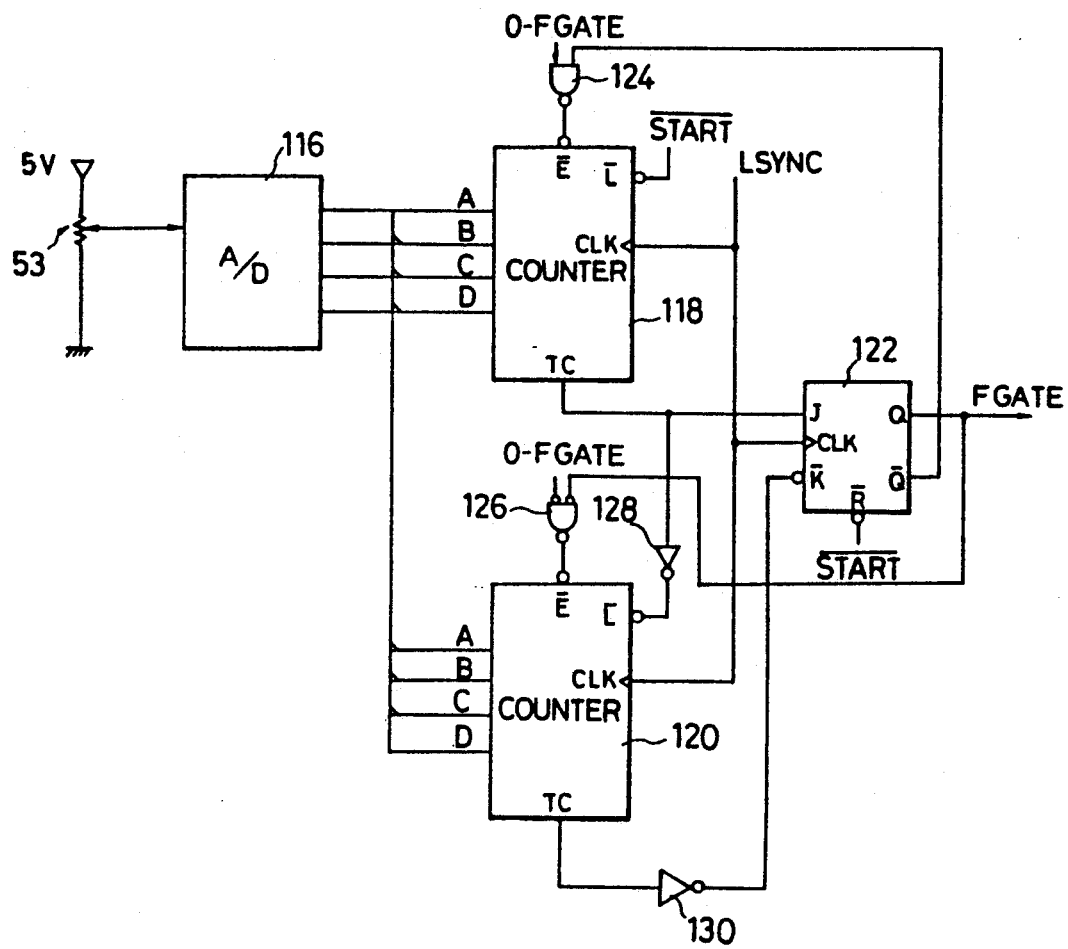
FIG. 29B is a circuit diagram indicating the configuration of the circuit that controls the scan timing.

In the scan controller 114, the circuit that generates the vertical synchronization signal FGATE is configured as shown in FIG. 29B.

The angle detect signal corresponding to the angle of inclination of the glass plate 21 and sent from the angle sensor 53 is input to an A/D converter 116. The A/D converter 116 outputs 4-bit angle signals corresponding to the angle detect signal. These 4-bit signals are used to express the angle in 16 steps. When the glass plate 21 is horizontal, a 4-bit signal corresponding to a middle value of the 16 steps (the 8th step) is output from the A/D converter 116. The (4-bit) angle signal output from the A/D converter 116 is input as preset data to a first counter 118 and a second counter 120. The first counter 118 and the second counter 120 are counted up in synchronization with the horizontal synchronization signal (LSYNC). When the first counter 118 and the second counter 120 reach the count value of "16", the signal output from the count output terminal (TC) becomes high level for a predetermined period of time. The signal output from the count output terminal (TC) of the first counter 118 is supplied to the J-terminal of the J-K flip-flop 122 that operates in synchronization with the horizontal synchronization signal (LSYNC). The signal output from the count output terminal (TC) of the second counter 120 passes through an inverter 130 and is supplied to the $\overline{K}$-terminal of the J-K flip-flop 122. The first counter 118 has the start signal ($\overline{START}$) supplied from the system controller 110. The start signal ($\overline{START}$) is also supplied to the J-K flip-flop 122 and the signal from the output terminal $\overline{Q}$ of the J-K flip-flop 122 is input to the NAND gate 124. The reference vertical synchronization signal (0-FGATE) is input to the NAND gate 124. The output signal of the NAND gate 124 is input as a allow signal to the terminal ($\overline{E}$) of the first counter 118. The second counter 120 is supplied via the inverter 128 with signal from the count output terminal (TC) of the first counter 118. This signal is the start signal for the second counter 120. The signal from the output terminal Q of the J-K flip-flop 122 are input the NOT-NAND gate 126 along with the reference vertical synchronization signal (0-FGATE). The output signal from the NOT-NAND gate 126 is input to the terminal ($\overline{E}$) of the second counter 120.

In the above circuit configuration, the signal output from the output terminal Q of the J-K flip-flop 122 become the vertical synchronization signal (FGATE).

The reference vertical synchronization signal (0-FGATE) is a signal generated at a predetermined timing inside the scan controller 114. The reference vertical synchronization signal (0-FGATE) is signal that is effective only for the period corresponding to the scan time of one line.

Figure 30:
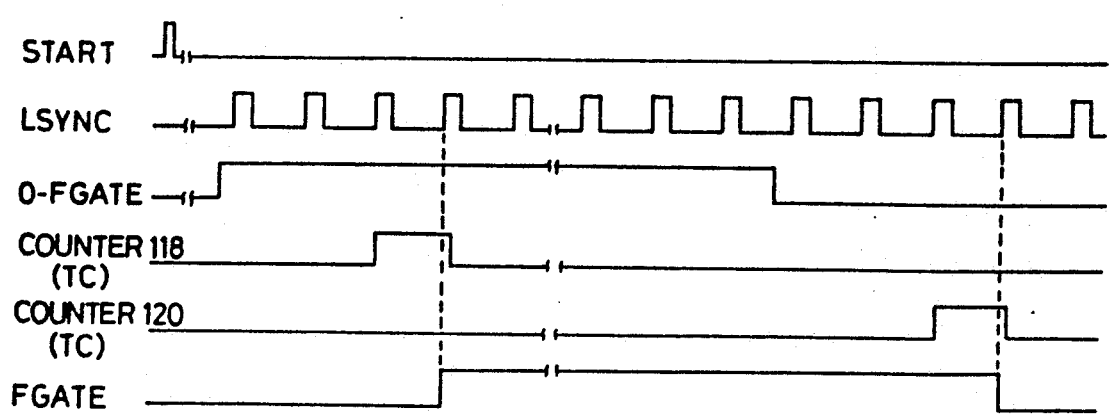
FIG. 30 is a timing chart that indicates the operation of the circuit indicated in FIG. 29B.

The circuit indicating in FIG. 29B operates in accordance with the timing chart indicated in FIG. 30.

After the rise of the start signal, the reference vertical synchronization signal (0-FGATE) is made effective at a predetermined timing. During the time that the reference vertical synchronization signal (0-FGATE) is effective, the first counter 118 is in the allow status. Then, the first counter 118 starts the count from the angle data that have been preset and when the count value becomes "16" there is rise for the signal from the count output terminal (TC). When there is rise for the signal from the count output terminal (TC), the J-K flip-flop 122 is set and the signal from the terminal Q of the J-K flip-flop 122 is risen. This is to say that the vertical synchronization signal (FGATE) rises.

When the reference vertical synchronization signal (0-FGATE) falls, the second counter 120 becomes the allow status. Then, the second counter 120 starts the count from the preset angle data and when that count value reaches "16", the signal from the count output terminal (TC) rises. When this signal from the count output terminal (TC) of the second counter 120 rises, the J-K flip-flop 122 is reset and the signal from the output terminal Q of the J-K flip-flop 122 falls. This is to say that the vertical synchronization signal (FGATE) falls.

By the above operation, the vertical synchronization signal (FGATE) delays the reference vertical synchronization signal (0-FGATE) as indicated in FIG. 30. The amount of this delay becomes in accordance with the angle data that has been preset in the first counter 118 and the second counter 120.

Figure 31:
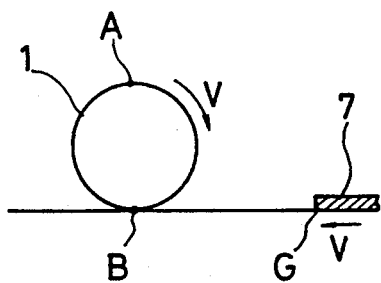
FIG. 31 is a view indicating the relationship of positions of the photosensitive drum and the recording sheet.

The following is an explanation of the relationship between the scan timing and the image formation, and is given with respect to FIG. 31.

The peripheral speed of the photosensitive drum 1 and the transportation speed of the recording sheet 7 are the same. A latent image formation start position (A) on the photosensitive drum 1, a transfer position (B) to the recording sheet 7 and a tip end position (G) of the recording sheet 7 are determined. The length of the arc between (A) and (B) is equal to the distance between (B) and (G). Accordingly, when an electrostatic latent image is formed from (A), a toner image corresponding to that electrostatic latent image is formed on the recording sheet 7 from its tip end.

As has been described above, the scan position moves in accordance with the angle of inclination of the glass plate 21 (Refer to FIG. 24). The output timing of the vertical synchronization signal (FGATE) is controlled by a time in accordance with this amount of movement. Whereby, a one-page scan can always start from the photosensitive drum 1 position (A) corresponding to the tip end of the recording sheet 7.

In this third embodiment, the angle of inclination of the glass plate 21 is detected by the angle sensor 53. The items contained in this specification can also be easily realized in systems that, in contrast to the system described above, the operator uses the operation panel 112 to input the data corresponding to the inclination angle of the glass plate 21.

The following is a description of a fourth embodiment according to the present invention, and is given with reference to FIG. 32 through FIG. 35C.

Figure 32:
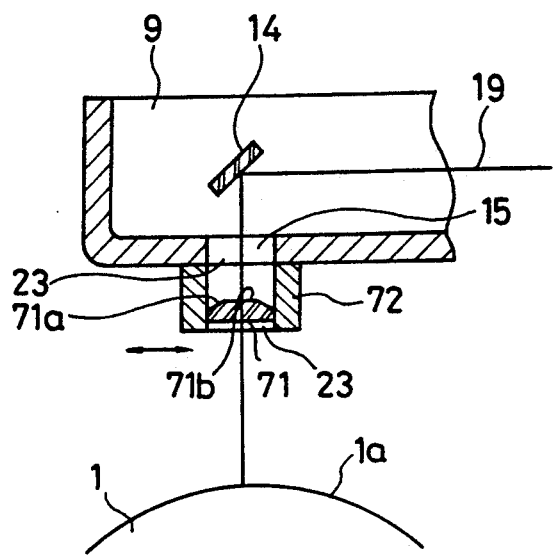
FIG. 32 is a sectional view indicating the mounting structure for the transparent member.

As is indicated in FIG. 32, the laser beam 19 reflected by the mirror 14 passes through the opening 15 formed in the bottom surface of the closed case 9 and is emitted to outside the closed case 9. A holder 72 is provided so as to cover the opening 15. The upper surface and the lower surface of the holder 72 have openings 23 formed in them. A glass column 71 (transparent member) is housed inside the holder 72. The shape across the section of this glass column 71 is such that it has a top surface 71b parallel to the base, and an inclined surface 71a. The holder 72 can be displaced in the direction perpendicular to the main scan of the laser beam 19, as indicated by the arrow. That is to say, it can be displaced in the direction of the sub scan.

Figure 33:
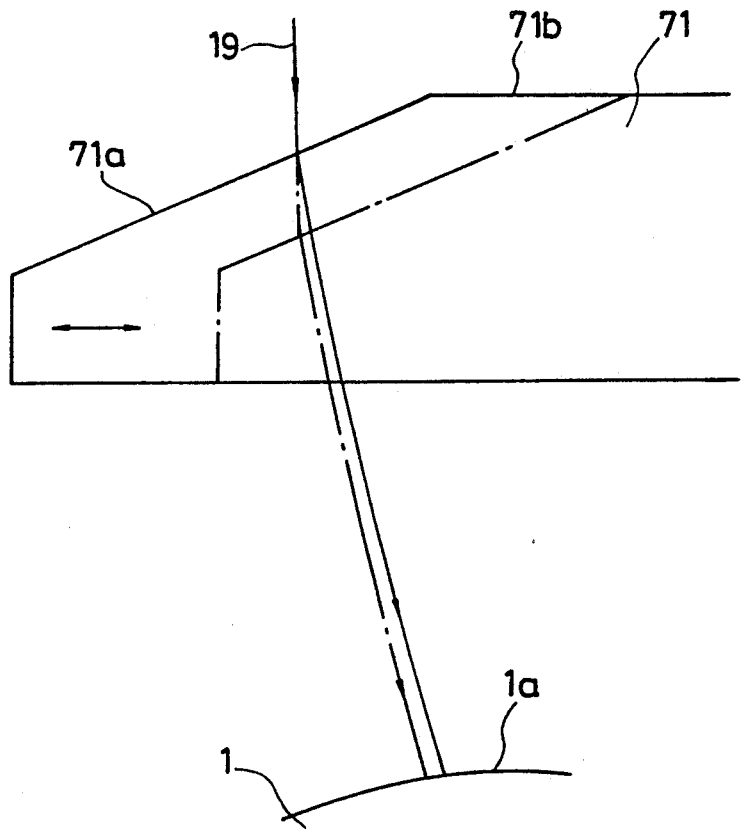
FIG. 33 is a view indicating the status where the laser beam passes through the transparent member.

The laser beam 19 irradiated to the surface 71a which is inclined with respect to the base of the holder 72 is refracted as indicated in FIG. 33, and is emitted from the bottom surface of the glass column 71. This emitted laser beam scans the surface 1a of the photosensitive drum 1. The glass column 71 is displaced in the direction of the sub scan so that the position of the scan lines on the surface 1a are displaced in the direction of the sub scan, as indicated by the solid and the broken lines in FIG. 33. Whereby, there is also a slight change in the degree of curvature of the scan lines, as in the case of the second embodiment.

Accordingly, the curving of the scan lines can be compensated for by suitable displacing the glass column 71 in the direction of the sub scan. The displacement in the direction of the sub scan, can be, for example, compensated for by adjusting the position in the direction of the sub scan, of the mirror 14.

Figure 34:
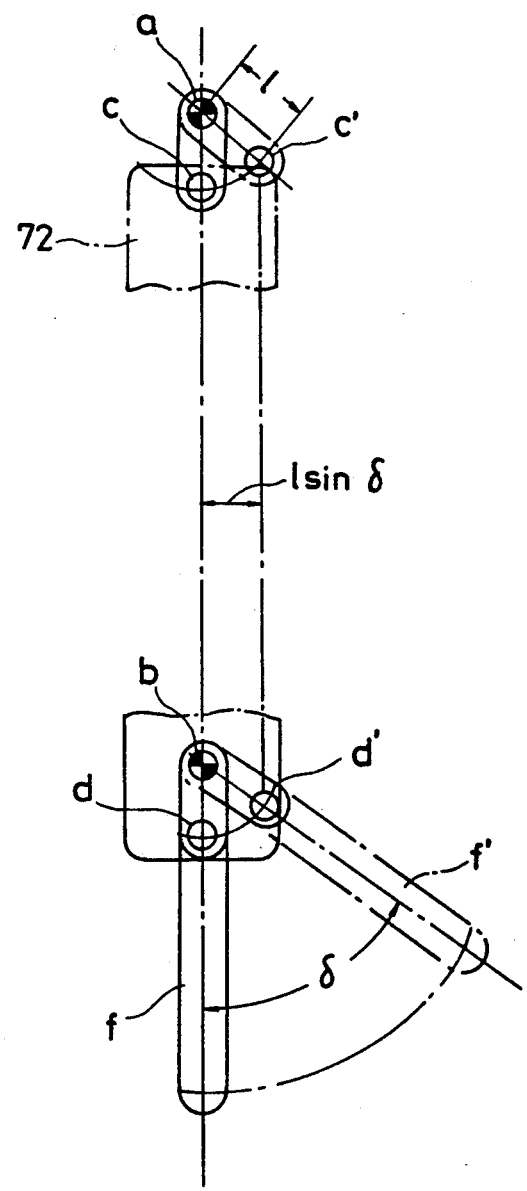
FIG. 34 is a view indicating the principle of the link mechanism that moves the transparent member in a parallel direction.
Figure 35A:
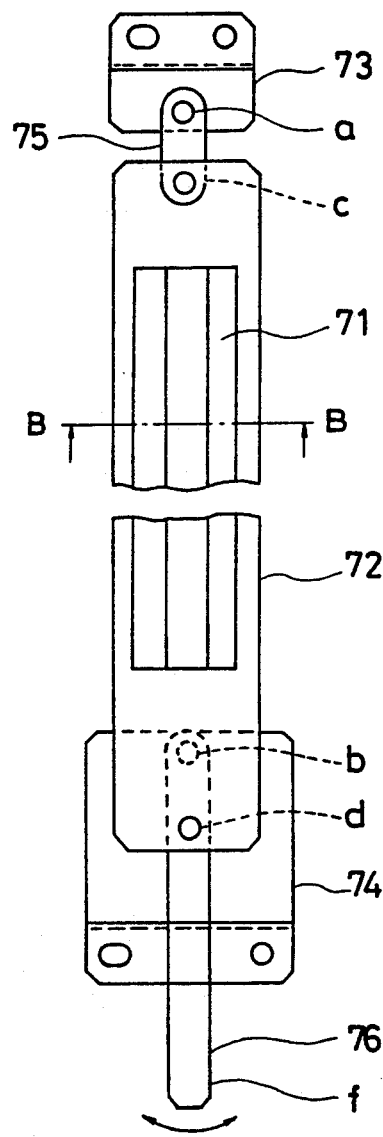
FIG. 35A, FIG. 35B and FIG. 35C are respectively, a top view, a side sectional elevational view and a frontal elevation indicating the structure of the link mechanism that moves the transparent member in a parallel direction.
Figure 35B:
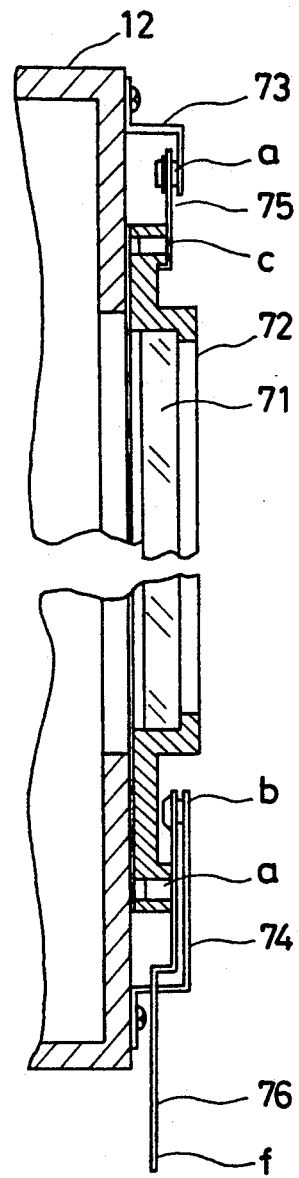
Figure 35C:
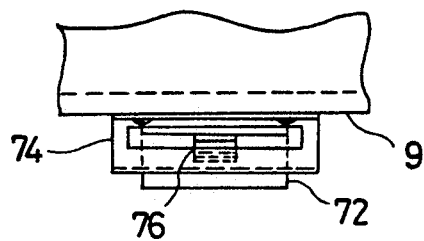

It is simple to use a parallel link as the mechanism that accurately moves the long glass column 71 so that it is parallel. FIG. 34 illustrates the principle of this, with more specific examples being indicated by FIG. 35A, FIG. 35B and FIG. 35C. Freely rocking levers 75 and 76 are mounted to pins (a) and (b) embedded in brackets 73 and 74 fixed at both of the ends of the sub scan of the opening 15 in the emitter portion of the closed case 9 of the laser beam scan unit 3. At positions (c) and (d) at the same length from the centers of rocking (a) and (b) of these levers is supported a holder 72 of the glass column 71 so as to be freely rotatable. The lever 76 forms an operation lever (f) which extends along the outside. The pins (a), (b), (c) and (d), the closed case 9, the lever 75, the support 72 and the lever 76 comprise a parallel link. In the same manner as in FIG. 34, the holder 72 moves the distance the lsinδ in the direction parallel to the direction of the sub scan when the operating lever (f) is used to rotate around the pin (b) by an angle of δ so that pins (c) and (d) move away from their position on a (a) (b) (c) (d) straight line.

As has been described above, according to the present invention, axis displacement and curvature of the scan lines on the photosensitive drum caused by scattering in the position and inclination of optical elements of an optical system of a laser beam scanning apparatus, can be easily corrected by a simple mechanism and make it possible for the scan lines to be straight lines at their required position and therefore enable an improvement in the image quality to be obtained.

The present invention is not limited to the aforementioned embodiments, and variations and modifications may be made without departing from the scope of the invention.

What is claimed is:

1. A light beam scanning apparatus comprising:
    a light source emitting a light beam;
    an optical system focusing the light beam emitted from the light source onto a moving image forming media;
    a beam scan mechanism moving the point of focus of said light beam on said image forming media, in a direction perpendicular to the direction of movement of said image forming media; and
    scan line correction mean for correcting a scan line to a straight line when said scan line is curved, said scan line being the track of the movement of the point of focus of the light beam on the image forming media.

2. The light beam scanning apparatus as claimed in claim 1, wherein said optical system has at least one mirror, and
    said scan line correction means has a mirror deformation mechanism curving said mirror in the normal direction.

3. The light beam scanning apparatus as claimed in claim 2, wherein said mirror deformation mechanism has a holder member holding both ends of said mirror, and a mechanism for pushing/pulling a central portion of said mirror towards/away from the normal direction.

4. The light beam scanning apparatus as claimed in claim 3, wherein said mechanism for pushing/pulling a central portion of said mirror towards/away from the normal direction has a holder provided on the rear side of said mirror, an adjustment screw in threaded connection with said holder, and a fixed screw fixed to the rear surface of said mirror and threaded on the same axis as said adjustment screw, the thread pitch of said adjustment screw being larger than the thread pitch of said fixed screw.

5. The light beam scanning apparatus as claimed in claim 1, wherein said scan line correction means has a transparent plate through which said light beam passes, and an inclination mechanism inclining said transparent plate with respect to said light beam.

6. The light beam scanning apparatus as claimed in claim 5, wherein said inclination mechanism has a rotating mechanism rotating said transparent plate around an axis parallel to the direction of the main scan.

7. The light beam scanning apparatus as claimed in claim 6, wherein said rotating mechanism has a plate support member supporting said transparent plate so that both surfaces through which said light beam passes are exposed, and a rotating and supporting member rotatably supporting said plate support member so that it is freely rotatable around an axis parallel to the scan line.

8. The light beam scanning apparatus as claimed in claim 7, wherein said plate support member has a case body which holds said transparent plate around its periphery, and an opening opposing both transparent surfaces of said transparent plate which allow said light beam to pass, an outer surface of said case body being formed in an arc shape, and
    a rotating holding member has an inner surface in a shape in agreement with said arc shaped outer surface of said case body, said inner surface having a member holding said case body so that it is in contact with an outer surface of said case body.

9. The light beam scanning apparatus as claimed in claim 5, wherein said inclination mechanism has a inclination support member supporting both ends of said transparent plate at a predetermined angle with respect to said light beam.

10. The light beam scanning apparatus as claimed in claim 5 further comprising:
    scan position compensation means for displacing the position of the scan line on the image forming media in a direction perpendicular to the direction of the main scan.

11. The light beam scanning apparatus as claimed in claim 10, wherein said optical system has a mirror reflecting said light beam from said light source, said light beam reflected by said mirror being irradiated through said transparent plate, and
    said scan position compensation means has a mirror moving mechanism moving said mirror so that the focus point of said light beam reflected from said mirror moves in the direction perpendicular to the scan line.

12. The light beam scanning apparatus as claimed in claim 11, wherein said mirror moving mechanism has a mirror holding member holding both ends of said mirror, and a slide mechanism for slidably moving said mirror holding member.

13. The light beam scanning apparatus as claimed in claim 10, wherein said optical system has a mirror reflecting said light beam from said light source, said light beam reflected by said mirror being irradiated through said transparent plate, and
    said scan position compensation means has a mirror rotation mechanism rotating said mirror around an axis parallel to the scan line, so that the focus point of the light beam reflected by said mirror onto said image forming media, moves in a direction perpendicular to said scan line.

14. The light beam scanning apparatus as claimed in claim 13, wherein said mirror rotation mechanism has a first support member supporting said mirror at a predetermined position on a line parallel to a scanning line at one end of a mirror surface of said mirror, a second support member supporting said mirror at a predetermined position on a line parallel to a scanning line at another end of a mirror surface of said mirror, a pressing mechanism pressing said mirror from its rear surface towards said first support member and said second support member, and a support member movement means so that at least one of said support members is moved so that it has a movement component in the direction perpendicular to said mirror.

15. The light beam scanning apparatus as claimed in claim 10, wherein said optical system has a mirror reflecting said light beam from said light source, said light beam reflected by said mirror being irradiated through said transparent plate, and said scan position compensation means has a mirror moving mechanism that moves said mirror so that the focus point of said light beam reflected by said mirror onto said image forming media moves in the direction perpendicular to said scan line, and a mirror rotation mechanism that rotates said mirror around an axis parallel to said scan line so that the focus point of said light beam reflected by said mirror is moved in the direction perpendicular to said scan line.

16. The light beam scanning apparatus as claimed in claim 10, wherein said scan position compensation means has timing control means for controlling the time that said light beam is emitted from said light source so that a scan start position on said image forming media is controlled.

17. The light beam scanning apparatus as claimed in claim 16, wherein said scan position compensation means has an inclination detect sensor detecting the angle that the transparent plate has been inclined by said inclination mechanism, and said timing control means controlling the time that said light beam is emitted from said light source, in accordance with the angle detected by said inclination detect sensor.

18. The light beam scanning apparatus as claimed in claim 1, wherein said scan line correction means has a transparent member having a surface inclined at a predetermined angle to a direction perpendicular to the scan line and with respect to said light beam so that said light beam incident to said inclined surface passes through said transparent member, and a movement mechanism moving said transparent member in a direction perpendicular to said scan line, further comprising:

scan position compensation means for displacing a position of said scan line on said image forming media in a direction perpendicular to the direction of the main scan.

19. The light beam scanning apparatus as claimed in claim 18, wherein said movement mechanism has a parallel link mechanism that has support points at both ends of said transparent member.

20. The light beam scanning apparatus as claimed in claim 18, wherein said optical system has a mirror reflecting said light beam from said light source, said light beam reflected by said mirror being irradiated through said transparent member, and said scan position compensation means has a mirror movement mechanism that moves said mirror so that the focus point of the light beam reflected by said mirror is moved in the direction perpendicular to the scan.

21. The light beam scanning apparatus as claimed in claim 18, wherein said optical system has a mirror reflecting said light beam from said light source, said light beam reflected by said mirror being irradiated through said transparent member, and said scan position compensation means has a mirror rotation mechanism rotating said mirror around an axis parallel to a scan line, so that the focus point of the light beam reflected by said mirror onto said image-forming media moves in a direction perpendicular to.

22. The light beam scanning apparatus as claimed in claim 18, wherein said optical system has a mirror reflecting said light beam from said light source, said light beam reflected by said mirror being irradiated through said transparent member, and said scan position compensation means has a mirror movement mechanism that moves said mirror so that the focus point of the light beam reflected by said mirror is moved in the direction perpendicular to the scan line, and a mirror rotation mechanism rotating said mirror around an axis parallel to the scan line, so that the focus point of the light beam reflected by said mirror onto the image forming media, moves in a direction perpendicular to the scan line.

23. The light beam scanning apparatus as claimed in claim 18, wherein said scan position compensation means has timing control means controlling the time that said light beam is emitted from said light source, and therefore the scan start position on said image-forming media.

24. The light beam scanning apparatus as claimed in claim 23, wherein said scan position compensation means has a movement amount detect sensor to detect the amount of movement of said transparent member by said movement mechanism, and a timing control means controls the timing of the emission of said light beam from a light source to be in accordance with said movement detect amount detected by said movement amount detect sensor.

25. A light beam scanning apparatus comprising:
a light source emitting a light beam;
a collimator lens through which the light beam passes so that the light beam becomes a parallel beam;
a cylindrical lens through which the light beam passing through said collimator lens passes;
a polygonal mirror which is rotated in a predetermined direction, the light beam passing through said cylindrical lens being incident to and reflected by said polygonal mirror
an f-θ lens through which the light beam reflected by said polygonal mirror which is rotated in a predetermined direction passes, so that the light beam emitted from said light source is focused onto an image forming media moving in a predetermined direction and a point of focus of the light beam moves in a direction perpendicular to the direction of movement of said image forming media; and
scan line correction means for correcting a scan line to a straight line when said scan line is curved, said scan line being the track of the movement of the point of focus of the light beam on the image forming media.

* * * * *